July 21, 1931. J. W. BATE 1,815,885

SCREW JACK

Filed Jan. 3, 1927 2 Sheets-Sheet 1

Inventor:
John W. Bate,
By Dyrenforth, Lee, Chritton & Wiles,
Attys.

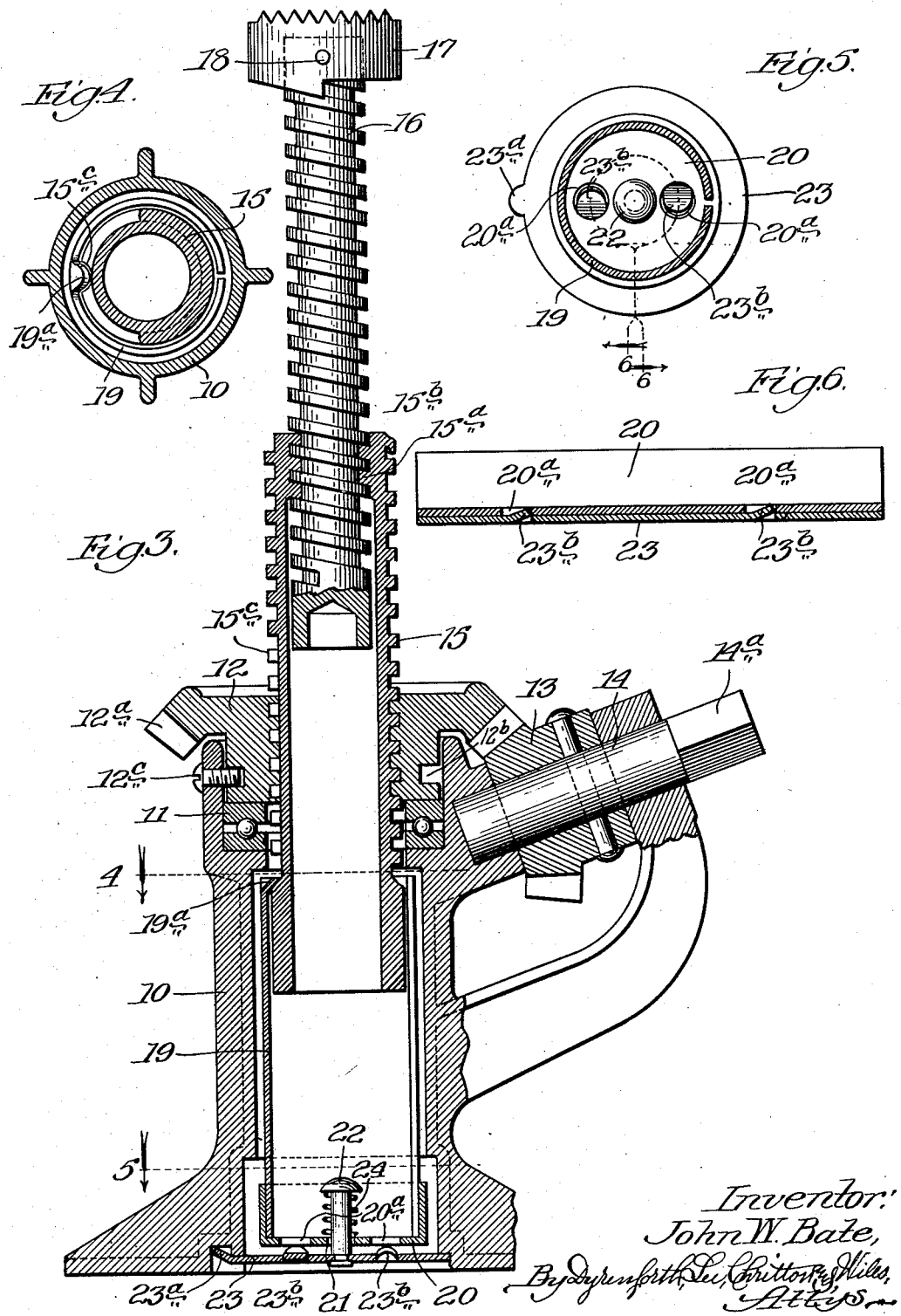

Patented July 21, 1931

1,815,885

UNITED STATES PATENT OFFICE

JOHN W. BATE, OF RACINE, WISCONSIN, ASSIGNOR TO WALKER MANUFACTURING COMPANY, OF RACINE, WISCONSIN, A CORPORATION OF WISCONSIN

SCREW JACK

Application filed January 3, 1927. Serial No. 158,660.

This invention relates to screw jacks particularly to double lift screw jacks which are used on automobiles having balloon tires. The invention is fully described in the following specification and shown in the accompanying drawings, in which:

Fig. 3 is a view similar to Fig. 1 showing the jack in raised position;

Fig. 4 is a partial sectional view on the line 4—4 of Fig. 3;

Fig. 5 is a similar view on the line 5—5 of Fig. 3; and

Fig. 6 is a developed view of the plate on the line 6—6 of Fig. 5.

Figure 1:
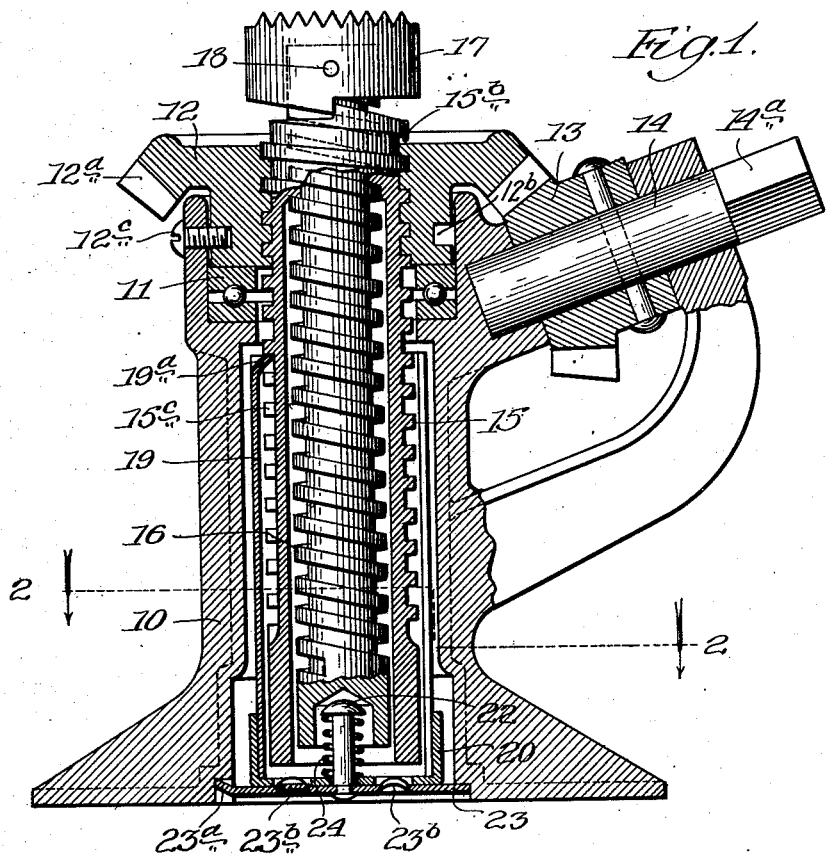
Figure 1 is a vertical section showing the jack in lowered position.
Figure 2:
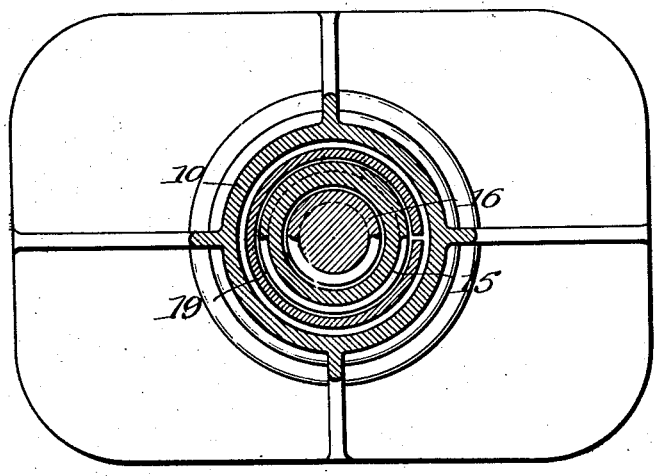
Fig. 2 is a horizontal section on the line 2—2 of Fig. 1.

The embodiment illustrated comprises a hollow housing 10 having a ledge in its upper portion on which rests a ball thrust bearing 11 which carries a nut 12 on the outer end of which is formed a bevel gear $12^a$. This gear is driven by means of a bevel pinion 13 which is pinned to a shaft 14, the latter being journaled in suitable bearings in the housing 10. This shaft is provided with a squared outer end $14^a$ to receive a suitable crank for turning the same. The nut 12 is provided with an annular groove $12^b$ into which projects the inner end of a retaining screw $12^c$. The nut 12 is internally threaded to receive the threaded outer screw 15, the threads of this screw stopping short of the bottom. This screw in turn is hollow and threaded at its upper portion $15^a$ to receive the threaded inner screw 16, the threads of which raise or stop short of the bottom of the screw. The inner screw is assembled by inserting through the bottom of the outer screw 15, and has a cap 17 which is secured thereon by means of a pin 18. When the outer screw is inserted full depth as shown in Fig. 1, it is prevented from entering further by any suitable means such as an indentation $15^b$ on the outer screw 15 which strikes the nut 12.

A tubular element 19 surrounds the outer screw 15 and has an ear $19^a$ which is bent inwardly so as to engage the groove $15^c$ in the outer screw 15 as shown in Figs. 3 and 4.

The tubular element 19 is secured to a metal plate 20 by any suitable means such as spot-welding, brazing or the like. This plate is provided with a central aperture 21 through which extends a pin 22, the pin being carried by a cover plate 23 which closes the bottom of the housing and is secured thereon in any suitable manner such as by peening the edge of the metal surrounding this cover plate. The pin 22 is provided with a head and carries a spring 24 which normally presses the plate 20 into contact with the cover plate 23. The cover plate 23 is provided with an ear $23^a$ which fits into a suitable projection in the bottom of the housing so as to prevent this cover plate from turning. The cover plate is also provided with two up-struck ears $23^b$ which are adapted to register with openings $20^a$ in the plate 20.

The operation of the jack is as follows: Starting with the jack parts in the position shown in Fig. 1, after the shaft 14 is turned in a direction to lower the jack, the movement will be resisted by the inner screw with the cap 17 when it is in contact with a load which thus prevents it from turning. If, however, there is no load on the jack, the inner and outer screws will be turned with the nut 12 and the outer screw acting through the ear $19^a$ will cause the plate 20 to turn in a clockwise direction as shown in Fig. 5. As it does so the openings $20^a$ will ratchet over the ears $23^b$.

When the shaft 14 is turned in a direction to raise the outer screw, the ears $23^b$ strike the edges of the openings $20^a$ thereby preventing the element 19 and the outer screw 15 from turning. The nut 12 therefore feeds the outer screw upwardly regardless whether or not the inner screw 16 turns with the outer screw, as when no load is applied, or whether it is prevented from turning as when a load is applied to the cap 17. Thus, as the nut 12 is turned the outer screw is raised with the turning until the ear $19^a$ on the element 19 reaches the lower end of the key-way $15^c$. When this happens the element 19 is raised lifting the plate 20 against the action of the spring 24 until the plate 20 clears the top of the ears $23^b$. As soon as this happens the plate is free to turn and permits the outer screw 15 to turn with the nut 12.

If now a load is carried by the cap 17, the inner screw is prevented from turning and, when the outer screw turns with the nut 12, the inner screw is fed through the nut 15ª at the upper end of the outer screw. If the nut 12 is turned in a direction to raise the load, the inner screw will continue to raise until the unthreaded end of the screw strikes the nut 15ª.

The lowering operation is the reverse of that used for raising. As the nut 12 and outer screw are turned, the inner screw 16 will be fed in until the cap 17 encounters the upper end of the outer screw 15 which will cause the outer screw to be held thereby forcing it to turn in the nut 12. If now the nut continues to turn in a direction to lower the jack, the outer screw member will be lowered until it is stopped at the bottom by the burred thread 15ᵇ as has been previously described.

While I have shown and described but a single embodiment of this invention, it is to be understood that it is capable of many modifications. Changes therefore in the construction and arrangement may be made which do not depart from the spirit and scope of the invention as disclosed in the appended claims.

I claim:

1. In a jack, a housing, inner and outer telescoping screw lifting members, a nut carried by said housing for lifting the outer screw, means for rotating said nut, an element adapted to engage said outer screw to prevent its rotation except at the top of its vertical movement, said element being connected to said housing to prevent the element from turning in one direction but permitting it to turn in the other direction, and means for disconnecting said element from said housing when the outer screw member is raised a predetermined amount to permit the outer screw member to turn with the nut.

2. In a jack, a housing, inner and outer telescoping screw lifting members, a nut carried by said housing for lifting the outer screw, means for rotating said nut, a key-way in the outer screw, an element having an ear engaging said key-way, means normally holding said element in contact with said housing, interengageable means permitting said element to be turned in one direction but preventing it from turning in the other direction, the ear on said element striking the lower end of the key-way as said outer screw is raised to the top of its movement to lift said element out of engagement with said interengaging means to permit said element to turn with the nut in either direction.

3. In a jack, a housing, inner and outer telescoping screw lifting members, a nut carried by said housing for lifting the outer screw, means for rotating said nut, a key-way in the outer screw, an element having an ear engaging said key-way, means normally holding said element in contact with said housing, ratchet teeth on said housing and element permitting said element to be turned in one direction but preventing it from turning in the other direction, the ear on said element striking the lower end of the key-way as said outer screw is raised to the top of its movement to lift said element out of engagement with said ratchet teeth to permit said element to turn with the nut in either direction.

4. In a jack, a housing, inner and outer telescoping screw lifting members, a nut carried by said housing for lifting the outer screw, means for rotating said nut, a key-way in the outer screw, an element having an ear engaging said key-way, means yieldably holding said element in contact with said housing, ratchet teeth on said housing and element permitting said element to be turned in one direction but preventing it from turning in the other direction, the ear on said element striking the lower end of the key-way as said outer screw is raised to the top of its travel.

5. In a jack, a housing, inner and outer telescoping screw lifting members, a nut carried by said housing for lifting the outer screw, means for rotating said nut, means for preventing rotary movement in one direction of said outer screw during the middle portion of its vertical movement but permitting rotary movement only in one direction at the bottom of said vertical movement, said means including a plate rotatable about an axis substantially coincident with the axis of said screws, and interengaging parts on said plate and housing.

6. In a device of the character set forth, a housing, a rotatable interiorly threaded nut carried by said housing and adapted to serve as a driving member, an exteriorly and interiorly threaded outer screw meshing within said nut, an inner screw member meshing within the threads of said outer screw, cooperating means on the housing and outer screw normally serving to prevent rotary movement in one direction of the outer screw, means cooperating with and actuated by said outer screw for disengaging said cooperating means, and means for rotating said nut.

7. In a jack, a housing, inner and outer telescoping screw lifting members, a nut carried by said housing for lifting the outer screw, means for rotating said nut, cooperating means on said housing and outer screw serving to prevent the outer screw from rotating in one direction, but permitting the rotation of said outer screw in the other direction, and means for disconnecting said co-operating means to permit rotation of said outer screw.

8. In a jack, a housing, inner and outer telescoping screw lifting members, a nut carried by said housing for lifting the outer screw, means for rotating said nut, cooperating means on said housing and outer screw serving to prevent the outer screw from rotating in one direction, but permitting the rotation of said outer screw in the other direction, and means for disconnecting said co-operating means to permit rotation of said outer screw when at the upper limit of its travel.

9. A lifting jack comprising a housing, an interiorly threaded driving member carried by said housing, inner and outer telescoping screw lifting members, said outer screw member meshing within said driving member, cooperating means carried by said housing and outer screw member serving to prevent rotation of said outer screw in one direction when at the lower limit of its travel, thereby causing said outer screw to rise, and means cooperating with and actuated by said outer screw for disengaging said cooperating means to permit rotation of said outer screw.

In testimony whereof I have hereunto set my hand this 24th day of December, 1926.

JOHN W. BATE.